(12) United States Patent
Vertriest

(10) Patent No.: US 7,922,790 B2
(45) Date of Patent: Apr. 12, 2011

(54) COMPRESSOR DEVICE

(75) Inventor: Danny Etienne Andrée Vertriest, Kontich (BE)

(73) Assignee: Atlas Copco Airpower Naamloze Vennootschap, Wilrijk (BE)

( * ) Notice: Subject to any disclaimer, the term of this patent is extended or adjusted under 35 U.S.C. 154(b) by 306 days.

(21) Appl. No.: 11/658,911

(22) PCT Filed: Jul. 20, 2005

(86) PCT No.: PCT/BE2005/000120
§ 371 (c)(1),
(2), (4) Date: Jan. 30, 2007

(87) PCT Pub. No.: WO2006/012710
PCT Pub. Date: Feb. 9, 2006

(65) Prior Publication Data
US 2009/0049984 A1  Feb. 26, 2009

(30) Foreign Application Priority Data
Aug. 2, 2004  (BE) .................................. 2004/0376

(51) Int. Cl.
*B01D 53/02* (2006.01)
(52) U.S. Cl. ......... 95/117; 55/DIG. 17; 95/118; 95/119; 95/121; 95/122; 95/123; 96/130; 96/143
(58) Field of Classification Search .................... 95/119, 95/121, 118, 123, 124, 125, 122, 117; 96/130, 96/143; 55/DIG. 17
See application file for complete search history.

(56) References Cited

U.S. PATENT DOCUMENTS

| | | | | |
|---|---|---|---|---|
| 1,998,774 A * | 4/1935 | Bulkeley | ........................... | 95/93 |
| 3,205,638 A * | 9/1965 | Hagle | ................. | 95/14 |
| 3,255,586 A * | 6/1966 | Hennig et al. | .................. | 60/773 |
| 3,446,479 A * | 5/1969 | Boldt | ....................... | 251/315.08 |
| 3,737,252 A * | 6/1973 | Pilarczyk et al. | ................ | 417/53 |
| 4,247,311 A * | 1/1981 | Seibert et al. | .................... | 96/111 |
| 4,342,338 A * | 8/1982 | Glennie | ........................ | 138/99 |
| 4,698,073 A * | 10/1987 | Rohde et al. | .................... | 95/123 |
| 4,761,968 A * | 8/1988 | Basseen et al. | .................. | 62/271 |
| 4,783,432 A | 11/1988 | Settlemyer | | |
| 4,950,311 A * | 8/1990 | White, Jr. | .......................... | 95/98 |
| 5,586,429 A * | 12/1996 | Kesseli et al. | ................... | 60/785 |
| 5,846,295 A * | 12/1998 | Kalbassi et al. | ................. | 95/105 |
| 6,015,260 A * | 1/2000 | Marichal | ..................... | 415/169.2 |
| 6,171,377 B1 * | 1/2001 | Henderson | ....................... | 96/122 |
| 6,221,130 B1 * | 4/2001 | Kolodziej et al. | ................. | 95/41 |
| 6,375,722 B1 * | 4/2002 | Henderson et al. | ............. | 96/112 |
| 6,723,155 B2 * | 4/2004 | Weyrich et al. | .................. | 95/120 |
| 2002/0134234 A1 * | 9/2002 | Kalbassi et al. | ................. | 95/11 |
| 2003/0233941 A1 * | 12/2003 | Battershell et al. | ............. | 96/112 |

* cited by examiner

Primary Examiner — Michael A Marcheschi
Assistant Examiner — Anthony Shumate
(74) Attorney, Agent, or Firm — Bacon & Thomas, PLLC

(57) ABSTRACT

Compressor device having a compressor (2) with an inlet (3) and an outlet (4); a compressed air line (5) which connects the outlet (4) of the compressor (2) to a user network (6); a drier (7) which is incorporated in the compressed air line (5) and which includes at least two air receivers (13-16) which are each provided with an inlet (14) and an outlet (15) and which are filled with desiccant or drying agent, which air receivers (13-16) work alternately, such that while one air receiver (13) is drying the compressed gas, the other air receiver (16) is regenerated; and a blow-off device (28) for blowing off at least a part of the gas compressed by the compressor when the compressor (2) works in no-load or in partial load, characterized in that mechanisms are provided which make it possible to guide the part of the compressed gas which is blown off via the blow-off device (28) through the regenerating air receiver (13).

10 Claims, 4 Drawing Sheets

COMPRESSOR DEVICE

FIELD OF THE INVENTION

The present invention concerns an improved compressor device.

BACKGROUND

The invention in particular concerns a compressor device of the type which consists of a compressor with an inlet and an outlet; a compressed air line which connects the outlet of the compressor to a user network; a drier which is incorporated in the above-mentioned compressed air line and which comprises at least two air receivers which are each provided with an intake and an output and which are filled with desiccant or drying agent, which air receivers work alternately, such that while one air receiver is drying the compressed gas, the other air receiver is regenerated; and a blow-off device to blow off at least a part of the gas compressed by the compressor when the compressor operates in no-load or partial load.

In full load operation, i.e. an operation whereby the compressor works at maximum output, this entire maximum output of compressed gas is sent at the outlet of the compressor through the regenerating air receiver so as to abstract moisture from the drying agent in said air receiver by making use of the heat of this compressed gas, and to thus regenerate the drying agent.

In partial load operation, however, i.e. when only a part of the compressed gas of the compressor is used, the excess output of the compressor is blown off into the atmosphere via a blow-off device at the outlet of the compressor.

In no-load operation, in other words when the compressed gas is not used, the entire output of the compressor is blown off into the atmosphere via the above-mentioned blow-off device.

A disadvantage of such known type of compressor device is that, in partial load operation, only a part of the available output of the compressor is used to regenerate the drying agent in the regenerating air receiver, which may lead to insufficient regeneration of the drying agent under certain circumstances.

This disadvantage is even bigger when the compressor device works in no-load operation, since the entire compressor output is then blown off and thus no output of compressed gas is available to regenerate the drying agent in the regenerating air receiver.

The invention aims to remedy the above-mentioned and other disadvantages by providing a compressor device whereby the entire compressor output is always used for regenerating the drying agent, irrespective of the consumption, and thus irrespective of whether the compressor device operates in full load, in partial load or in no-load.

SUMMARY

To this end, the invention concerns an improved compressor device of the above-mentioned type, whereby means are provided which make it possible to guide the part of the compressed gas which is blown off via the blow-off device through the regenerating air receiver concerned.

In this manner, a sufficient amount of warm, compressed gas always flows through the regenerating air receiver so as to make sure that there is always an effective regeneration of the drying agent.

According to a practical embodiment, the above-mentioned means comprise one or several connecting pipes between the intakes of the above-mentioned air receivers, and the blow-off device is formed by a branch which is connected to one of these connecting pipes.

Preferably, a throttle valve is provided in the inlet of the compressor which is activated when the compressor operates in no-load, such that in no-load, the compressed air is additionally heated as a result of the throttling, and a more efficient regeneration is thus obtained.

In order to better explain the characteristics of the invention, the following preferred embodiment of an improved compressor device according to the invention is given as an example only without being limitative in any way, with reference to the accompanying drawings, in which:

DETAILED DESCRIPTION

Figure 1:
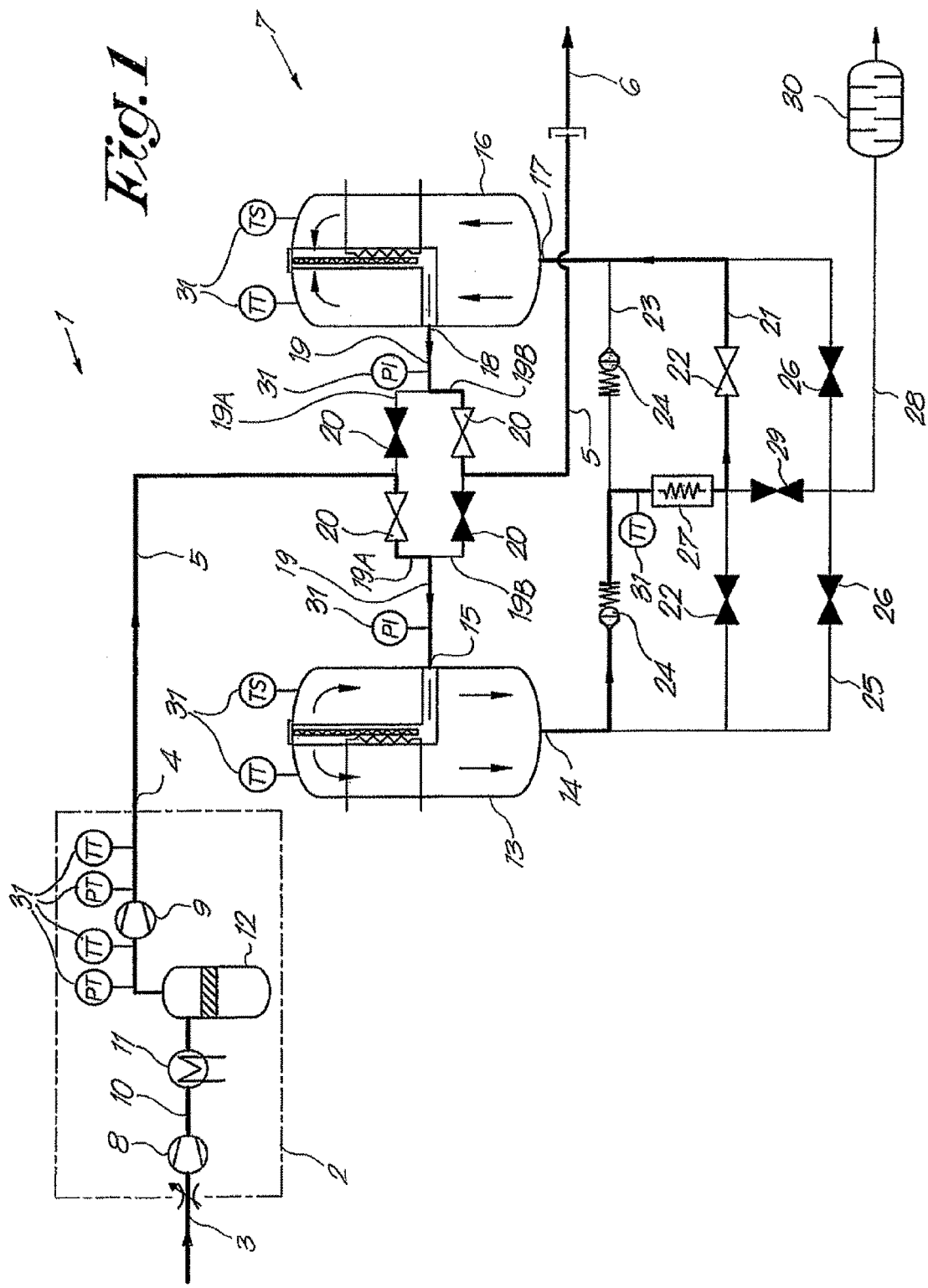
FIG. 1 represents an improved compressor device according to the invention.

The compressor device 1 of FIG. 1 mainly consists of a compressor 2 with an inlet 3 and an outlet 4; a compressed air line 5 which connects the outlet 4 of the compressor 2 to a user network 6 and a drier 7 which is incorporated in the above-mentioned compressed air line 5.

The compressor 2 in this case mainly consists of a low pressure stage 8 and a high pressure stage 9 connected in series by means of a pressure pipe 10 in which are successively incorporated an intercooler 11 and a water separator 12.

The drier 7 contains a first insulated air receiver 13, with an inlet 14 and an outlet 15 containing silica gel or any other drying agent whatsoever; a second insulated air receiver 16, with an inlet 17 and an outlet 18 which also comprises silica gel as a drying agent.

Each of the outlets 15 and 18 of both air receivers 13 and 16 is connected, via a split pipe 19 and a valve 20 in each split part 19A and 19B of the pipe 19, to the compressed air line 5, whereby this compressed air line 5 is interrupted between the above-mentioned connections of the split parts 19A and 19B on the compressed air line 5.

The inlets 14 are mutually connected by means of three connecting pipes, a first connecting pipe 21 with two stop cocks 22, a second connecting pipe 23 with non-return valves working in the opposite direction and a third connecting pipe 25 respectively, with two stop cocks 26 as well.

The first and second connecting pipes are bridged by a cooler 27 which is connected with its inlet to the second connecting pipe 23, more particularly between the non-return valves 24 in this pipe 23, and which is connected with its outlet to the first connecting pipe 21, more particularly between the stop cocks 22 of this pipe 21.

A blow-off device 28 for blowing off compressed gas is provided in the form of a branch which is connected to the first connecting pipe 21 between the stop cocks 22 and which opens into the atmosphere.

In this blow-off device 28 is provided a stop cock 29, as well as a sound absorber 30 at the output of the blow-off device 28.

The blow-off device 28 is in this case also connected to the third connecting pipe 25, more particularly between the stop cocks 26 of this pipe and downstream in relation to the stop cock 29.

The compressor device 1 is preferably also provided with a controller, not represented in the figures, which makes it possible to set the operating conditions of the compressor 2 and to open or close the valves 20 and stop cocks 22 and 26, depending on the required operating conditions of the compressor device 1.

The compressor device 1 can also be provided with measuring equipment 31, PT, TT, PI, TS to measure temperatures, pressures, and if necessary, also the dew point, which measuring equipment is connected to the above-mentioned controller to control the compressor device 1.

The working of the improved compressor device 1 according to the invention is simple and is illustrated by means of FIGS. 1 to 4, whereby the valves 20 and the stop cocks 22 and 26 are represented in black when closed and in white when open, and whereby the path followed by the compressed gas is represented in bold.

FIG. 1 represents the compressor device 1 when the compressor 2 operates in full load, i.e. at its maximum capacity.

In this case, the entire non-cooled compressed gas flow, coming from the outlet 4 of the compressor 2, is guided counterflow through the air receiver 13, namely from the outlet 15 to the inlet 14, where this gas flow will regenerate the drying agent or desiccant, for example silica gel, making use of the heat contained in the compressed gas.

Next, the compressed gas flow goes to the cooler 27 where it is cooled, to be then guided through the air receiver 16 so as to dry the compressed gas.

The outlet 18 of the air receiver 16 is at that time connected to the user network 6 onto which are connected one or several consumers of compressed gas, not represented here.

Figure 2:
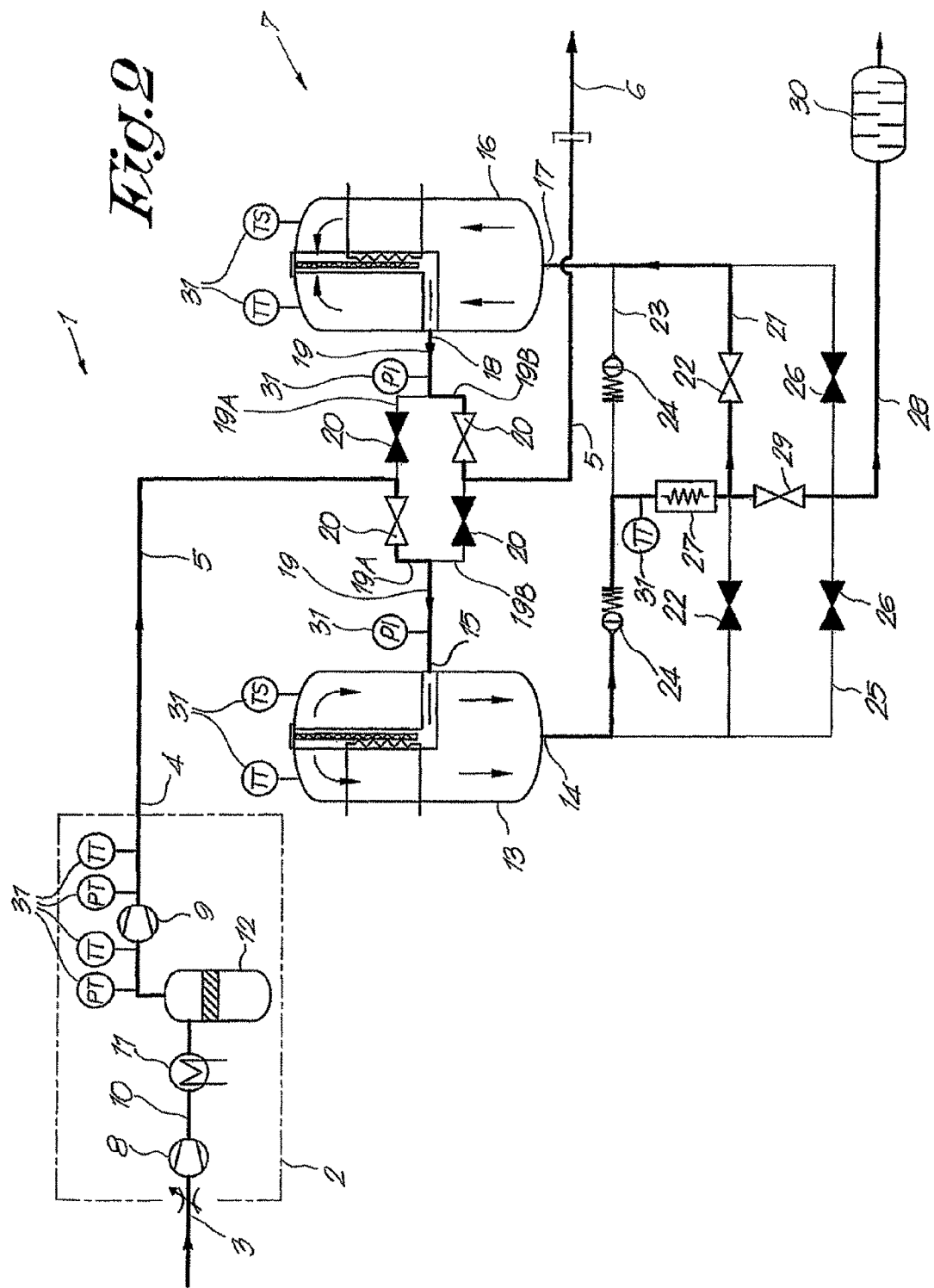
FIGS. 2, 3 and 4 represent the compressor device of FIG. 1, but for other operating conditions.

FIG. 2 represents the compressor device 1 in partial load operation whereby the user network 6 only requires a part of the output of the compressor 2.

In this case, just as with a full load, the entire output of compressed gas is guided counterflow through the regenerating air receiver 13 in order to regenerate the drying agent, but this output, after its passage through the air receiver 13, is split in a part which is necessary for the restricted needs of the consumer network 6, supplied to the network 6 via the cooler 27 and the drying air receiver 16, and an excess part which is blown off into the atmosphere via the blow-off device 28 according to the invention.

Thanks to the invention, also in case of a partial load, the entire output of the compressor 2 will flow through the regenerating air receiver, as opposed to the known systems whereby only the output required by the network 6 was sent through the regenerating vessel 13, and the excess output was blown off directly into the atmosphere at the outlet 4 of the compressor 2 without passing first through the regenerating air receiver 13.

A compressor device 1 according to the invention offers the advantage that, also in partial load, the drying agent in the regenerating air receiver 13 is always maximally regenerated.

Figure 3:
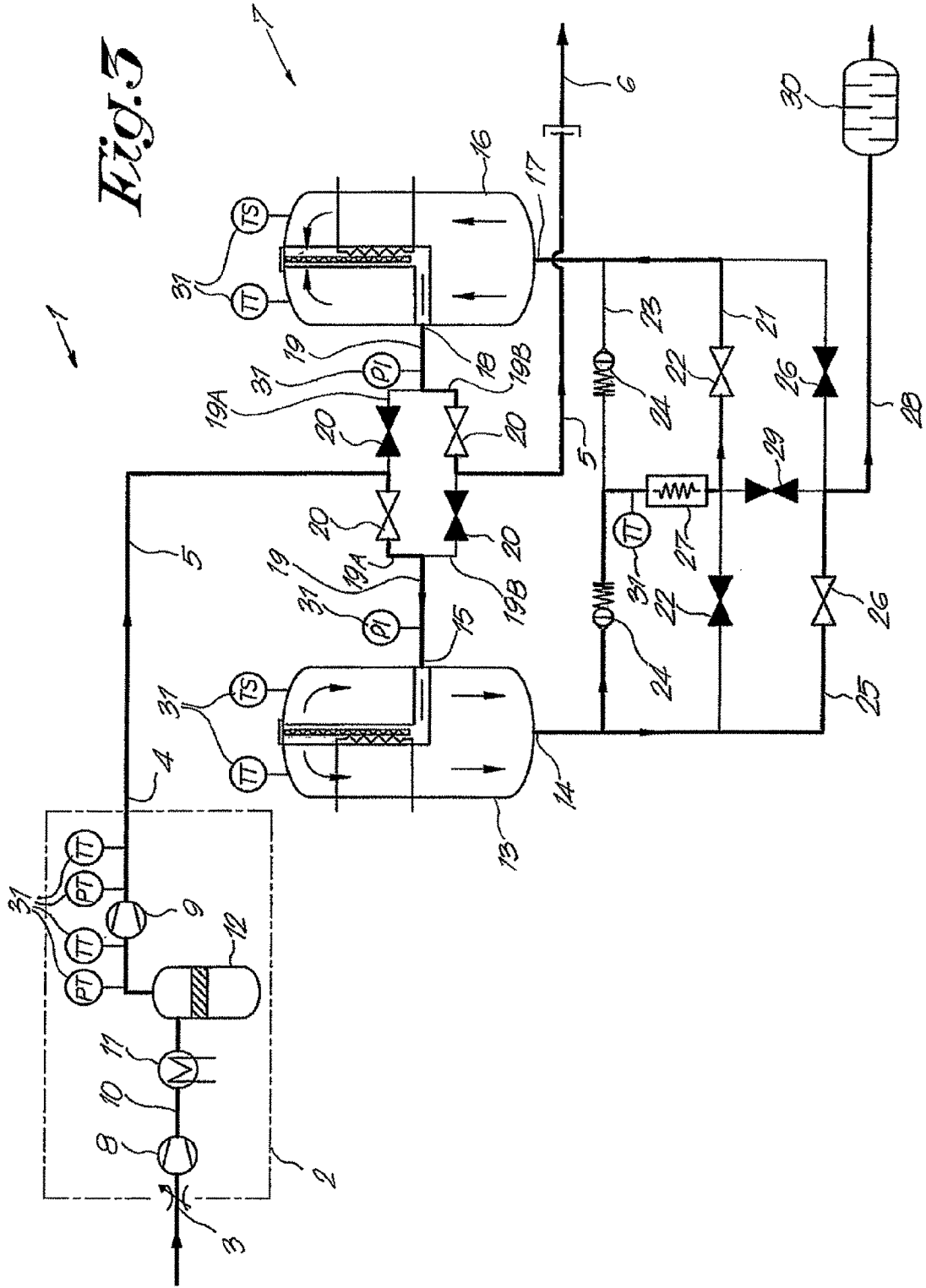

FIG. 3 shows an alternative of a partial load operation, whereby the excess output which is blown off into the atmosphere via the blow-off device 28 is in this case not branched downstream but upstream in relation to the cooler 27, such that no additional energy is required for cooling than said output blown off into the atmosphere.

Figure 4:
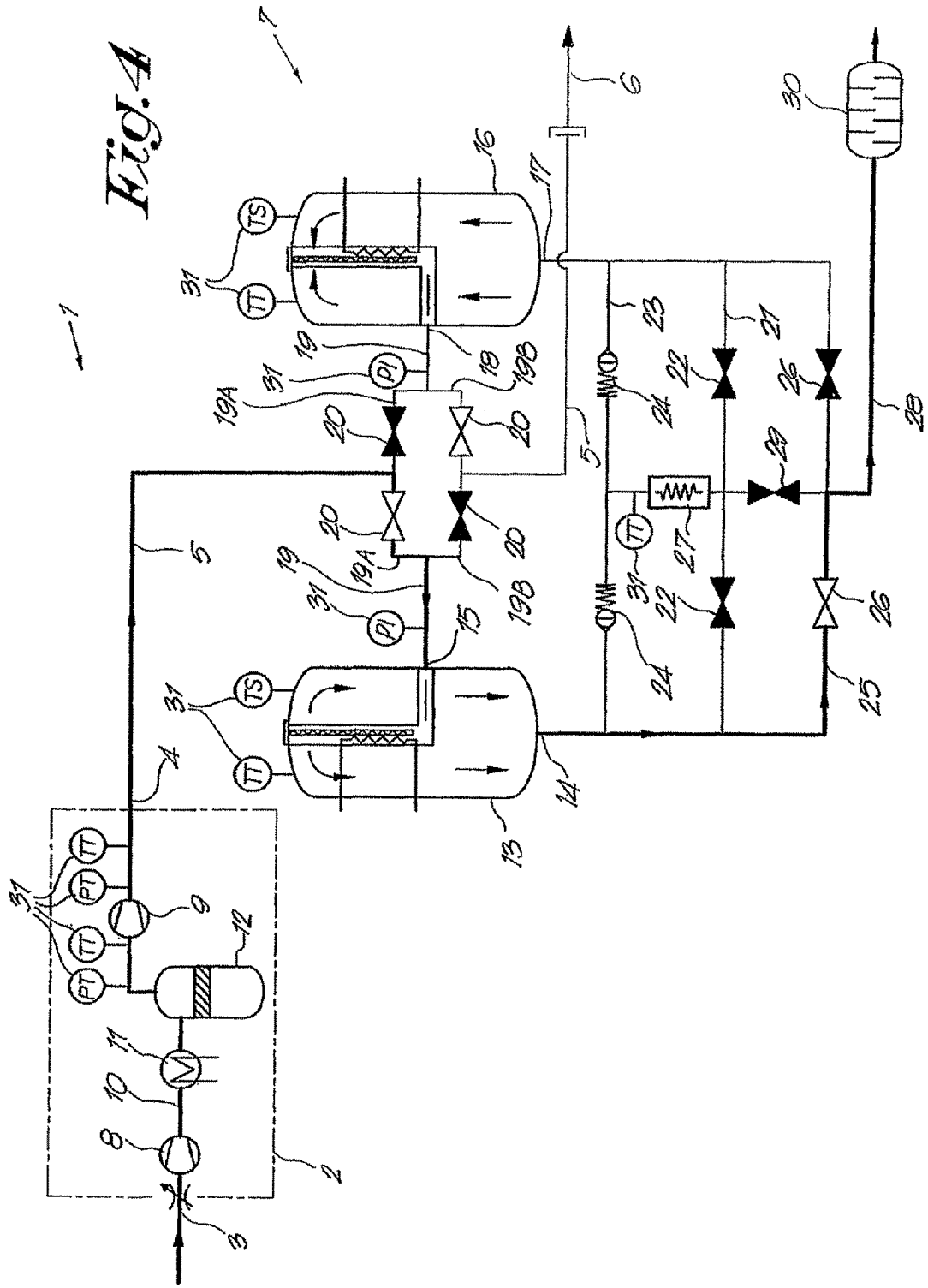

FIG. 4 represents the no-load operation of the compressor device 1, whereby no compressed gas is taken by the user network 6 in this case.

In this case, the compressor 2 is made to run idle and pressureless, whereby a minimum amount of gas is sucked in, compressed and blown off into the atmosphere.

As opposed to the known compressor devices, in the case of the invention, the compressed gas is not blown off directly at the outlet 4, but it is sent through the regenerating air receiver first to be then blown off into the atmosphere via the blow-off device 28.

In this manner is ensured a minimal regeneration of the drying agent in the regenerating air receiver 13, also during the no-load operation.

It is clear that, in this case, the output to be blown off is branched between the air receiver 13 and the non-return valve 24 in order to prevent gas under pressure from escaping from the user network 6 via the blow-off device 28 into the atmosphere.

The inlet 3 of the compressor 2 may optionally be provided with a throttle device which is at least activated in no-load operation.

Thanks to this throttling, the compressed gas reaches higher temperatures at the outlet 4 of the compressor, as a result of which a warmer gas is sent through the regenerating air receiver and a better regeneration of the drying agent is thus obtained.

It is clear that, instead of the valves 20 and the connecting pipes 21, 23 and 25 with their respective stop cocks 22, 26 and non-return valves 24, other means can be provided which make it possible to send the excess, non-used part of the compressed gas through the regenerating air receiver 13 in partial load and in no-load operation.

It is also clear that the blow-off 28 must not necessarily take place in the atmosphere, but in the case of medical gases, for example, the blow-off can take place in a controlled environment at a pressure which is lower than the pressure at the outlet 4 of the compressor 2.

The compressor 2 must not necessarily be a multi-stage compressor.

The terminology of the intakes 14-17 and of the outlets 15-18 of the air receivers 13-16 are selected as a function of the operation of the air receivers as a drying air receiver. During the regeneration of the drying agent, the compressed gas, in the given example, flows counterflow through the air receiver 13 concerned, i.e. from the outlet to the inlet.

It is clear that the present invention is not restricted to the above-described improved compressor device, but that it can be applied in all sorts of shapes and combinations while still remaining within the scope of the invention.

The invention claimed is:

1. Method for drying compressed gas, comprising:
    guiding a first fraction of compressed gas through a first air receiver (13) in order to regenerate the desiccant or drying agent therein provided by heat of the compressed gas, and then guiding said first fraction through a second air receiver (16) including desiccant or drying agent to dry said first fraction; and
    blowing off a second fraction of compressed gas into the atmosphere, said second fraction, before being blown off, being also guided through said first air receiver (13) together with the first fraction, to regenerate this first air receiver (13);
    wherein said second fraction does not pass through the second air receiver prior to being blown off.

2. Method for drying compressed gas according to claim 1, wherein the compressed gas guided through the first air receiver (13) is only split in said first and second fractions in a partial load operation of the compressor.

3. Method for drying compressed gas according to claim 1, wherein the first fraction of gas is cooled before being guided through and dried by the second air receiver (16).

4. Method for drying compressed gas according to claim 1, wherein the second fraction of gas is cooled before being blown off.

5. Compressor system comprising:
- a compressor (2) with an inlet (3) and an outlet (4);
- a compressed air line (5) connecting the outlet (4) to a user network (6);
- a drier (7) which is incorporated in the compressed air line (5) and which comprises at least two air receivers (13-16) which are each provided with an inlet (14) and an outlet (15) and which are filled with desiccant or drying agent, which air receivers (13-16) work alternately, such that while one air receiver (13) is drying the compressed gas, the other air receiver (16) is regenerated by heat of the gas compressed by the compressor;
- a blow-off device (28) arranged to blow off at least a part of the gas compressed by the compressor when the compressor (2) works in no-load or in partial load, and means enabling the entire non-cooled output of compressed gas from the outlet of the compressor (2) to be first guided through the regenerating air receiver (13) for regenerating this regenerating air receiver before at least part of this compressed gas is blown off via the blow-off device (28) into the atmosphere;
- wherein said enabling means comprises a plurality of connecting pipes (21-23-25) between the inlets (14-17) of the air receivers (13-16) and wherein the blow-off device (28) comprises a branch which is connected to one of said plurality of connecting pipes;
- wherein a first connecting pipe (21) of the plurality of connecting pipes is provided with two stop cocks (22) and wherein the blow-off device (28) between these two stop cocks (22) is connected to the first connecting pipe (21); and
- wherein at least a second connecting pipe (23) of the plurality of connecting pipes is provided with two opposed non-return valves (24) working in opposite directions, so that the first and second connecting pipes (21-23) are bridged by a cooler (27) which is connected with an intake thereof between the non-return valves (24) of the second connecting pipe (23) and which cooler is connected with its output between the stop cocks (22) of the first connecting pipe (21).

6. Compressor system according to claim 5, wherein the blow-off device (28) is provided with a stop cock (29).

7. Compressor system according to claim 5, comprising a third connecting pipe (25) of the plurality of connecting pipes with two stop cocks (26), wherein the blow-off device (28) is connected downstream in relation to a stop cock (29) of the blow-off device (28) to the third connecting pipe.

8. Compressor system according to claim 5, wherein the blow-off device (28) opens to the atmosphere.

9. Compressor system according to claim 8, wherein the blow-off device (28) is provided with a sound absorber (30).

10. Compressor system according to claim 5, wherein the inlet (3) of the compressor (2) comprises a throttle valve which can be at least activated when the compressor (2) functions in no-load.

* * * * *